(12) United States Patent
Trethewey

(10) Patent No.: US 11,392,532 B2
(45) Date of Patent: Jul. 19, 2022

(54) ADJUSTABLE POWER DELIVERY SCHEME FOR UNIVERSAL SERIAL BUS

(71) Applicant: Intel Corporation, Santa Clara, CA (US)

(72) Inventor: James R. Trethewey, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 256 days.

(21) Appl. No.: 16/775,196

(22) Filed: Jan. 28, 2020

(65) Prior Publication Data

US 2020/0233830 A1 Jul. 23, 2020

Related U.S. Application Data

(63) Continuation of application No. 14/998,223, filed on Dec. 24, 2015, now Pat. No. 10,545,907.

(51) Int. Cl.
| | |
|---|---|
| *G06F 13/42* | (2006.01) |
| *H02J 50/10* | (2016.01) |
| *H02J 50/80* | (2016.01) |
| *G06F 1/26* | (2006.01) |
| *H02J 7/00* | (2006.01) |
| *G06F 1/32* | (2019.01) |

(52) U.S. Cl.
CPC .......... *G06F 13/4282* (2013.01); *G06F 1/266* (2013.01); *H02J 7/00* (2013.01); *H02J 50/10* (2016.02); *H02J 50/80* (2016.02); *G06F 1/32* (2013.01); *G06F 2212/2146* (2013.01); *H02J 7/00034* (2020.01); *Y02D 10/00* (2018.01)

(58) Field of Classification Search
CPC .................................. G06F 1/26; G06F 1/32
See application file for complete search history.

(56) References Cited

U.S. PATENT DOCUMENTS

| | | | |
|---|---|---|---|
| 5,874,723 | A | 2/1999 | Hasegawa et al. |
| 7,852,045 | B2 | 12/2010 | Matsumura |
| 7,853,818 | B2 | 12/2010 | Nguyen |
| 8,599,589 | B2 | 12/2013 | Lum |
| 8,624,513 | B2 | 1/2014 | Moss |

(Continued)

FOREIGN PATENT DOCUMENTS

| | | |
|---|---|---|
| CN | 204129667 | 1/2015 |
| CN | 104345859 | 2/2015 |
| CN | 204650452 | 9/2015 |

OTHER PUBLICATIONS

Advisory Action dated Sep. 24, 2018 for U.S. Appl. No. 14/998,223.

(Continued)

*Primary Examiner* — Phil K Nguyen
(74) *Attorney, Agent, or Firm* — Schwabe, Williamson & Wyatt, P.C.

(57) ABSTRACT

Described is an apparatus which comprises: an adjustable power supply source to generate an adjustable power supply; a node to provide the adjustable power supply to a device; and a bus which is operable to: send a first message to the device indicating that the adjustable power supply source is capable of dynamically providing an adjustable power supply; and receive a request from the device, the request indicating a new voltage or current specification.

21 Claims, 10 Drawing Sheets

(56) References Cited

U.S. PATENT DOCUMENTS

| | | |
|---|---|---|
| 9,112,419 B2 | 8/2015 | Nate |
| 9,130,394 B2 | 9/2015 | Burdo et al. |
| 9,160,182 B2 | 10/2015 | Keating et al. |
| 9,379,555 B2 | 1/2016 | Huynh |
| 9,369,040 B1* | 6/2016 | Dosluoglu ............ G06F 1/3296 |
| 10,152,104 B2* | 12/2018 | Waters .................... G06F 1/305 |
| 10,298,048 B1 | 5/2019 | Juan et al. |
| 2007/0013350 A1* | 1/2007 | Tang ................. H02M 3/1584 |
| | | 323/237 |
| 2007/0260896 A1 | 11/2007 | Brundridge |
| 2008/0054855 A1 | 3/2008 | Hussain et al. |
| 2008/0185918 A1 | 8/2008 | Metz et al. |
| 2008/0222431 A1 | 9/2008 | Paniagua et al. |
| 2008/0315842 A1 | 12/2008 | Li |
| 2010/0015375 A1 | 1/2010 | Beyer et al. |
| 2010/0181961 A1 | 7/2010 | Novak et al. |
| 2010/0201313 A1 | 8/2010 | Vorenkamp et al. |
| 2010/0225283 A1 | 9/2010 | Hsia |
| 2011/0084656 A1 | 4/2011 | Gao |
| 2011/0167281 A1 | 7/2011 | Rathi et al. |
| 2011/0181110 A1 | 7/2011 | Walley et al. |
| 2012/0025622 A1 | 2/2012 | Kim et al. |
| 2013/0082662 A1 | 4/2013 | Carre |
| 2013/0181539 A1 | 7/2013 | Muratov et al. |
| 2013/0200841 A1 | 8/2013 | Farkas |
| 2013/0238920 A1* | 9/2013 | Harris .................... G06F 1/325 |
| | | 713/323 |
| 2013/0311798 A1 | 11/2013 | Sultenfuss et al. |
| 2014/0092659 A1 | 4/2014 | Lin et al. |
| 2014/0117922 A1 | 5/2014 | Pham |
| 2014/0136863 A1 | 5/2014 | Frichtman et al. |
| 2014/0143933 A1* | 5/2014 | Low ........................ H02J 7/025 |
| | | 2/170 |
| 2014/0152251 A1 | 6/2014 | Kim et al. |
| 2014/0194099 A1 | 7/2014 | Park |
| 2014/0245030 A1 | 8/2014 | Helfrich et al. |
| 2014/0312856 A1 | 10/2014 | Burrell et al. |
| 2015/0002086 A1 | 1/2015 | Matos et al. |
| 2015/0035477 A1 | 2/2015 | Wong et al. |
| 2015/0121095 A1 | 4/2015 | Tsai et al. |
| 2015/0137789 A1 | 5/2015 | Furtner |
| 2015/0236522 A1 | 8/2015 | Zhao |
| 2015/0248151 A1* | 9/2015 | Lim .................... G06F 13/4282 |
| | | 713/310 |
| 2015/0270733 A1 | 9/2015 | Inha et al. |
| 2015/0301552 A1 | 10/2015 | Lim |
| 2015/0331464 A1 | 11/2015 | Balasubramanian |
| 2015/0362984 A1* | 12/2015 | Waters .................. G06F 1/3215 |
| | | 713/324 |
| 2016/0006267 A1 | 1/2016 | Muratov et al. |
| 2016/0049803 A1 | 2/2016 | Hsu |
| 2016/0173678 A1* | 6/2016 | DeCamp ................. G06F 1/266 |
| | | 455/557 |
| 2016/0181850 A1* | 6/2016 | Toivola .................... H02J 50/00 |
| | | 320/108 |
| 2016/0224100 A1 | 8/2016 | Chen |
| 2017/0008162 A1 | 1/2017 | Tsubota |
| 2017/0047784 A1 | 2/2017 | Jung |
| 2017/0060207 A1 | 3/2017 | Backman |
| 2017/0126039 A1 | 5/2017 | Nguyen |

OTHER PUBLICATIONS

Extended European Search Report dated Jul. 3, 2019 for EP Patent Application No. 16879653.0.
Final Office Action dated Apr. 2, 2018 for U.S. Appl. No. 14/757,558.
Final Office Action dated Jul. 3, 2018 for U.S. Appl. No. 14/998,223.
Final Office Action dated Aug. 8, 2019 for U.S. Appl. No. 16/775,196.
International Preliminary Report on Patentability dated Jul. 5, 2018 for PCT Application No. PCT/US16/62446.
International Search Report and Written Opinion for International Application No. PCT/US2016/062446, dated Feb. 28, 2017.
International Search Report and Written Opinion for International Patent Application PCT/US2016/063629, dated Mar. 9, 2017.
Non Final Office Action for U.S. Appl. No. 14/998,223, dated May 17, 2017.
Non-Final Office Action for U.S. Appl. No. 14/998,223, dated Nov. 16, 2017.
Non-Final Office Action dated Sep. 21, 2017 for U.S. Appl. No. 14/757,558.
Notice of Allowance dated Sep. 26, 2019 for U.S. Appl. No. 14/998,223.
Search Report & Written Opinion dated Oct. 9, 2019 for Singapore Patent Application No. 10201609838Y.
Non-Final Office Action dated Apr. 1, 2019 for U.S. Appl. No. 14/998,223.
USB 3.2 Specification http://www.usb.org/developers/docs/ downloaded on Aug. 28, 2018 (2 pages).
USB.org—USB Type-C™ http://www.usb.org/developers/usbtypec/ downloaded on Aug. 28, 2018 (2 pages).
Wikipedia. USB Type-C. https://en.wikipedia.org/wiki/USB-C#USB_3.0/3.1/3.2 downloaded on Aug. 28, 2018 (9 pages).
Office Action dated Dec. 30, 2020 for Chinese Patent Application No. 201680075384.0. No translation.

* cited by examiner

US 11,392,532 B2

ADJUSTABLE POWER DELIVERY SCHEME FOR UNIVERSAL SERIAL BUS

CLAIM OF PRIORITY

This Application is a Continuation of, and claims priority to, U.S. patent application Ser. No. 14/998,223, filed on Dec. 24, 2015 and titled "Adjustable Power Delivery Scheme for Universal Serial Bus", issued as U.S. Pat. No. 10,545,907 on Jan. 28, 2020, which is incorporated by reference in its entirety for all purposes.

BACKGROUND

The Universal Serial Bus (USB) Revision 3.1 Power Delivery (USB-PD) Specification Revision 2.0 V1.1 of May 7, 2015 states that the USB has evolved from a data interface capable of supplying limited power to a primary provider of power with a data interface. Today, many devices charge or get their power from USB ports contained in laptops, cars, aircraft, or even wall sockets. USB has become a ubiquitous power socket for many small devices such as cell phones, MP3 players and other hand-held devices. Users need USB to fulfill their requirements not only in terms of data but also to provide power to, or charge, their devices simply, often without the need to load a driver, in order to carry out "traditional" USB functions.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
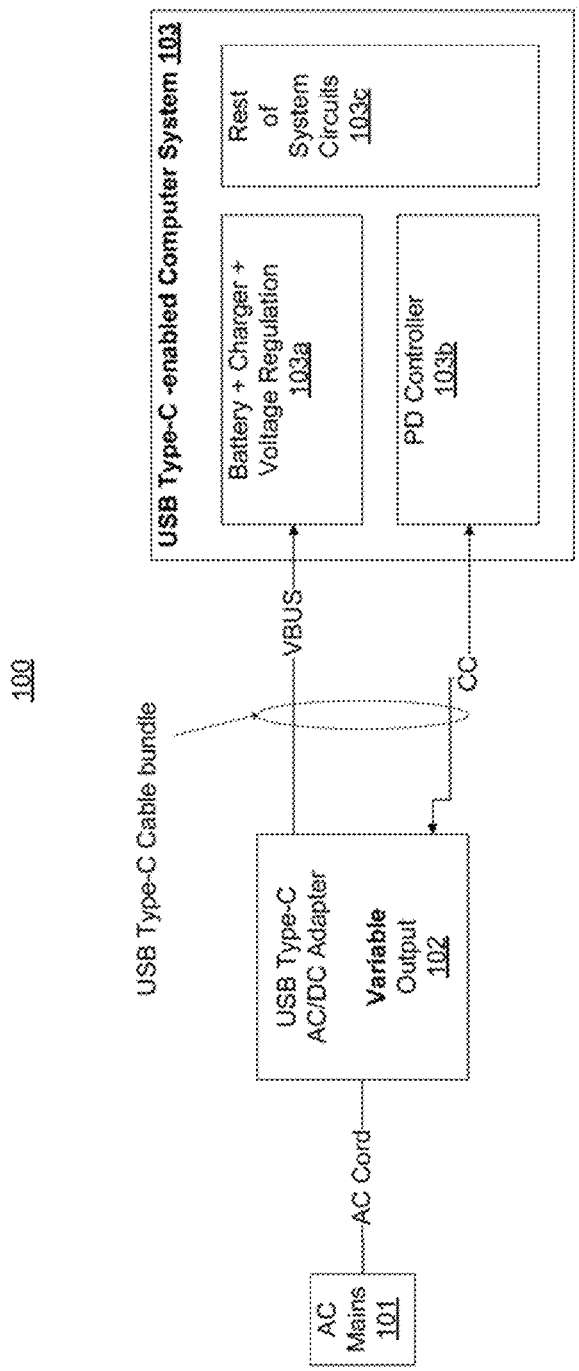
FIG. 1 illustrates a typical Universal Serial Bus (USB) power delivery system using a variable power source.

The USB-PD Specification defines three types of power sources: Fixed Supply, Battery Supply, and Variable Supply (non-battery). See, for example, Table 6-4 Power Data Object of the Universal Serial Bus (USB) Revision 3.1 Power Delivery (USB-PD) Specification Revision 2.0 V1.1 of May 7, 2015, which in part is reproduced below:

TABLE 6-4

| Power Data Object | | |
|---|---|---|
| Bit(s) | Description | |
| B31 ... 30 | Value | Parameter |
| | 00b | Fixed supply (Vmin = Vmax) |
| | 01b | Battery |
| | 10b | Variable Supply (non-battery) |
| | 11b | Reserved |

Fixed Supply is used to expose well regulated fixed voltage power supplies (e.g., 5V regulated supply). Battery Supply is used to expose batteries that can be connected directly as a Source to VBUS. VBUS is an interconnect that carries the power supply. Variable Supply is currently defined to be for "poorly regulated Sources" and specifies a minimum and maximum voltage range, and maximum current.

The USB-PD Specification, however, does not define a "well regulated Variable source" or even a "digitally controlled well regulated Variable source." Nor does the USB-PD Specification define how a Power Consumer (e.g., a phone to be charged via a USB cable) would make request to a Variable power source (i.e., Power Provider) for a specific voltage and/or current within a supported range. As such, the Variable type of power source is unable to tune power input to closely match the efficiency characteristics of a Consumer's voltage regulator (VR). The Variable type of power source is also unable to tune power input to meet the real-time power demands of an electronic circuit.

Various embodiments specify changes to the USB-PD Specification that can define both a scheme and Protocol Messages exchanged by a Power Provider and Power Consumer to adjust a well-regulated Variable source (or an adjustable power source).

Here, the term "Power Provider" or "Provider," as defined in the USB-PD Specification, is a capability of a PD (Power Delivery) Port (typically a Host, Hub, or Wall Wart Downstream facing port (DFP)) to source power over the power conductor (e.g., VBUS). This corresponds to a Type-A Port or a Type-C Port with resistor Rp (not shown) asserted on its CC Wire.

Here the term "Power Consumer" or "Consumer," as defined in the USB-PD Specification, is the capability of a PD Port (typically a Device's Upstream Facing Port (UFP)) to sink power from the power conductor (e.g. VBUS). This corresponds to a Type-B Port or a Type-C Port with resistor Rd (not shown) asserted on its CC Wire.

Some embodiments describe an apparatus and method for enabling dynamic adjustment of power supply in a USB environment. There are many technical effects of various embodiments. For example, some embodiments allow the design of more power-efficient circuitry. In one instance, a USB compliant device (e.g., a Consumer) may detect sudden increase in power demand and may request adjustment of power supply input provided from an adjustable USB power source (e.g., a Provider). Such, precise dynamic adjustment of power supply is currently not possible with USB-PD 2.0 compliant power sources. However, various embodiments provide a new messaging protocol that is compatible with USB-PD 2.0 defined messaging protocols to allow request and dynamic provision of power supply to a USB device (i.e., Consumer). Other technical effects will be evident from the various embodiments and figures.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level. The terms "substantially," "close," "approximately," "near," and "about," generally refer to being within +/−10% of a target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C). The terms right: "front," "back," "top," "bottom," "over," "under," and the like in the description and in the claims, if any, are used for descriptive purposes and not necessarily for describing permanent relative positions.

For purposes of the embodiments, the transistors in various circuits and logic blocks described here are metal oxide semiconductor (MOS) transistors or their derivatives, where the MOS transistors include drain, source, gate, and bulk terminals. The transistors and/or the MOS transistor derivatives also include Tri-Gate and FinFET transistors, Gate All Around Cylindrical Transistors, Tunneling FET (TFET), Square Wire, or Rectangular Ribbon Transistors, ferroelectric FET (FeFETs), or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors—BJT PNP/NPN, BiCMOS, CMOS, etc., may be used without departing from the scope of the disclosure.

FIG. 1 illustrates a typical USB PD system 100 using a Variable power source. System 100 consists of an Alternating Current (AC) Main switch 101 (e.g., typical a wall socket to provide AC voltage and current), a USB Type-C AC/DC (where DC is Direct Current) Adaptor 102 (also referred to as the Variable power source) with Variable Output, and USB Type-C enabled computer system 103. System 103 is also referred to as the Power Consumer or Consumer while Adaptor 102 is also referred to as the Power Provider or Provider. Power Provider 102 is coupled to the AC Main 101 via an AC Power Cord. Power Provider 102 communicates with the Power Consumer 103 via VBUS and CC wire(s), which may be part of USB Type-C Cable bundle. A Type-C cable bundle may include VBUS and CC wires and other wires ("not shown"), such as USB2, USB3, SBU1/SBU2, GND, etc.

Power is provided to Consumer 103 through VBUS wire(s) of the USB Type-C cable. Power negotiation messages (e.g., sending a source capabilities list or menu and a selection from that list) between Consumer 103 and Provider 102 is performed over the CC wire(s) of the USB Type-C cable bundle. The source capabilities include a mandatory vSafe5V (i.e., 5V Fixed Supply) Power Data Object (PDO) and a Variable Output PDO (i.e., Variable Supply (non-battery)).

Consumer 103 may be any consumer device (e.g., phone, laptop, printer, etc.) that uses the power supply provided by VBUS to operate. Consumer 103 may include a regulation module or logic 103a such as a battery, charger, and/or voltage regulator (e.g., DC-DC switching regulator). Regulation module or logic 103a is a hardware block that receives power supply from VBUS and uses that power supply to provide regulated power supply to other blocks in Consumer 103. Consumer 103 also includes a PD Controller 103b. PD Controller 103b may be implemented in hardware or software and is responsible for communicating with Provider 102. The rest of the system circuits (e.g., sensor, memory, phone hardware, etc.) of Consumer 103 are lumped here in module 103c. A typical power delivery process performed by PD Controller 103b of Consumer 103 and Provider 102 is illustrated with reference to FIG. 2.

Figure 2:
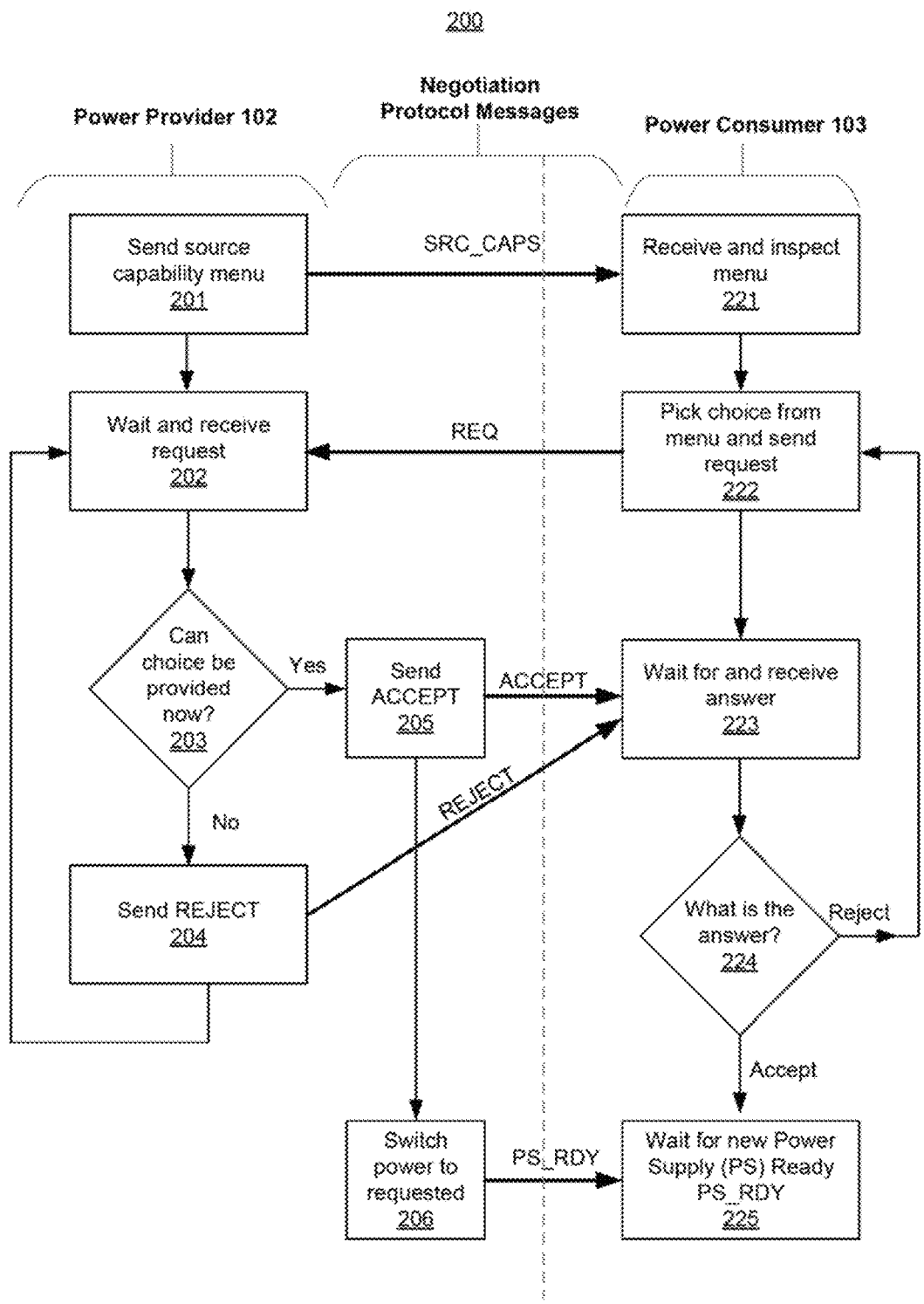
FIG. 2 illustrates a plot showing the negotiation protocol for the USB power delivery system of FIG. 1.

FIG. 2 illustrates plot 200 showing the negotiation protocol for the USB power delivery system of FIG. 1. Plot 200 shows operations and negotiations performed by Power Provider 102 and Power Consumer 103 to achieve a desired power supply.

At block 201, Provider 102 sends a Source_Capabilities (SRC_CAPS) message as defined by the USB-PD 2.0 Specification to Consumer 103 over wire(s) CC. For example, Provider 102 sends a menu of available power sources (e.g., Power Data Object(s) (PDO) such as fixed, battery, and variable, plus a tuple of a specific voltage and current) to Consumer 103 over wire(s) CC. A PDO is used to expose a Source Port's power capabilities or a Sink's power requirements as part of a Source_Capabilities or Sink_Capabilities message, respectively. Here, a Source is Provider 102 and a Sink is Consumer 103. At block 221, Consumer 103 receives the menu and inspects PDOs in the menu and selects a favorite choice which can only be one of the PDOs offered by the Provider (i.e., current specification revision does not allow going off menu).

At block 222, Consumer 103 picks a choice from the menu of offered PDOs and sends a Request (REQ) message for its favorite power supply choice to Provider 102. At block 202, Provider 102 waits for and receives the REQ message. The REQ message is defined in Table 6-3 Data Message Types of UBS-PD 2.0 Specification, which is reproduced below:

circuit. For example, if a Consumer VR suddenly needs 14V (fourteen Volts) and Provider 102 can provide either 5V or 20V, then when 20V is provided by Provider 102, Consumer 103 is wasting energy because it is getting more than it needs which translates to low efficiency.

Figure 3:
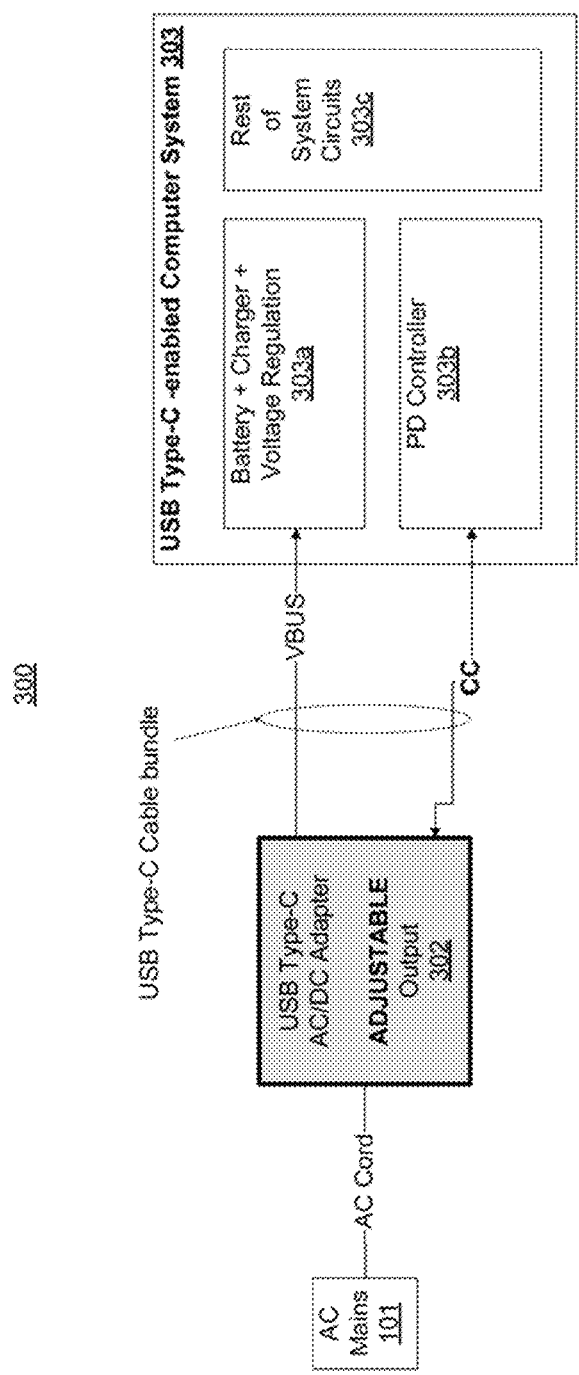
FIG. 3 illustrates a USB power delivery system using an adjustable power source, in accordance with some embodiments of the disclosure.

FIG. 3 illustrates a USB power delivery system 300 using an adjustable power source, in accordance with some embodiments of the disclosure. It is pointed out that those elements of FIG. 3 having the same reference numbers (or names) as the elements of any other figure can operate or function in any manner similar to that described, but are not limited to such. Compared to FIG. 1, here, the power supply provider is capable of dynamically providing an adjustable voltage or current, in accordance with some embodiments. This provider is referred to as Provider 302.

In some embodiments, Provider 302 is capable of receiving a power supply request (e.g., a new voltage and/or current request) at any time and can service that request while using the same interface (i.e., the same USB Type-C Cable bundle). In some embodiments, Provider 302 includes part or all of blocks of FIG. 5B to execute the process of providing a new voltage and/or current. Referring back to FIG. 3, here, Consumer 303 is different from Consumer 103 in that Consumer 303 is capable of requesting a new power

TABLE 6-3

Data Message Types

| Bits 3 . . . 0 | Type | Sent by | Description | Valid Start of Packet |
|---|---|---|---|---|
| 0000 | Reserved | | All values not explicitly defined are Reserved and shall not be used | |
| 0001 | Source_Capabilitites | Source or Dual-Role | See Section 6.4.1.2 | SOP only |
| 0010 | Request | Sink only | See Section 6.4.2 | SOP only |
| 0011 | BIST | Tester, Source or Sink | See Section 6.4.3 | SOP* |
| 0100 | Sink_Capabilties | Sink or Dual-Role | See Section 6.4.1.3 | SOP only |

At block 203, Provider 102 ensures whether it can provide the selected power supply requested at the moment and sends ACCEPT or REJECT message as appropriate. At block 204, if a REJECT message is generated (e.g., Provider 102 is unable to provide the requested supply level), Provider 102 waits for a new Request to service and returns to block 202. At block 205, if an ACCEPT message is generated (e.g., Provider 102 is able to provide the requested power supply), Provider 102 moves to execute block 206. At block 206, Provider 102 switches power to the Requested parameters and sends PS_RDY (Power Supply Ready) indication to Consumer 103.

At the Consumer side, at block 223, Consumer 103 waits for and receives the answer from Provider 102 (e.g., ACCEPT or REJECT message). At block 224, Consumer 103 inspects the answer. If a REJECT message is received by Consumer 103, Consumer 103 goes back to executing process block 222 to pick a next-best choice. If an ACCEPT message is received, then at block 225, Consumer 103 waits for the new power indication from Provider 102 in the form of the PS_RDY (Power Supply Ready) message.

The Variable type of power source (i.e., Provider 102) is unable to tune power input to closely match the efficiency characteristics of a Consumer's VR. The Variable type of power source is also unable to tune power input to meet the real-time (or dynamic) power demands of an electronic voltage and/or current using a new messaging protocol as described with reference to FIGS. 4A-B.

Referring back to FIG. 3, in some embodiments, Consumer 303, like Consumer 103, may be any consumer device (e.g., phone, laptop, printer, etc.) that uses the power supply provided by VBUS to operate. In some embodiments, Consumer 303 may include a regulation module or logic 303a such as a battery, charger, and/or voltage regulator (e.g., DC-DC switching regulator). Regulation module or logic 303a is a hardware block that receives power supply from VBUS and uses that power supply to provide regulated power supply to other blocks in Consumer 303.

In some embodiments, Consumer 303 also includes PD Controller 303b. In some embodiments, PD Controller 103b may be implemented in hardware or software and is responsible for communicating with Provider 302. The rest of the system circuits of Consumer 303 are lumped here in module 303c. In some embodiments, PD Controller 303b includes part or all of blocks of FIG. 5A to execute the process of requesting and receiving a new voltage and/or current.

Figure 4A:
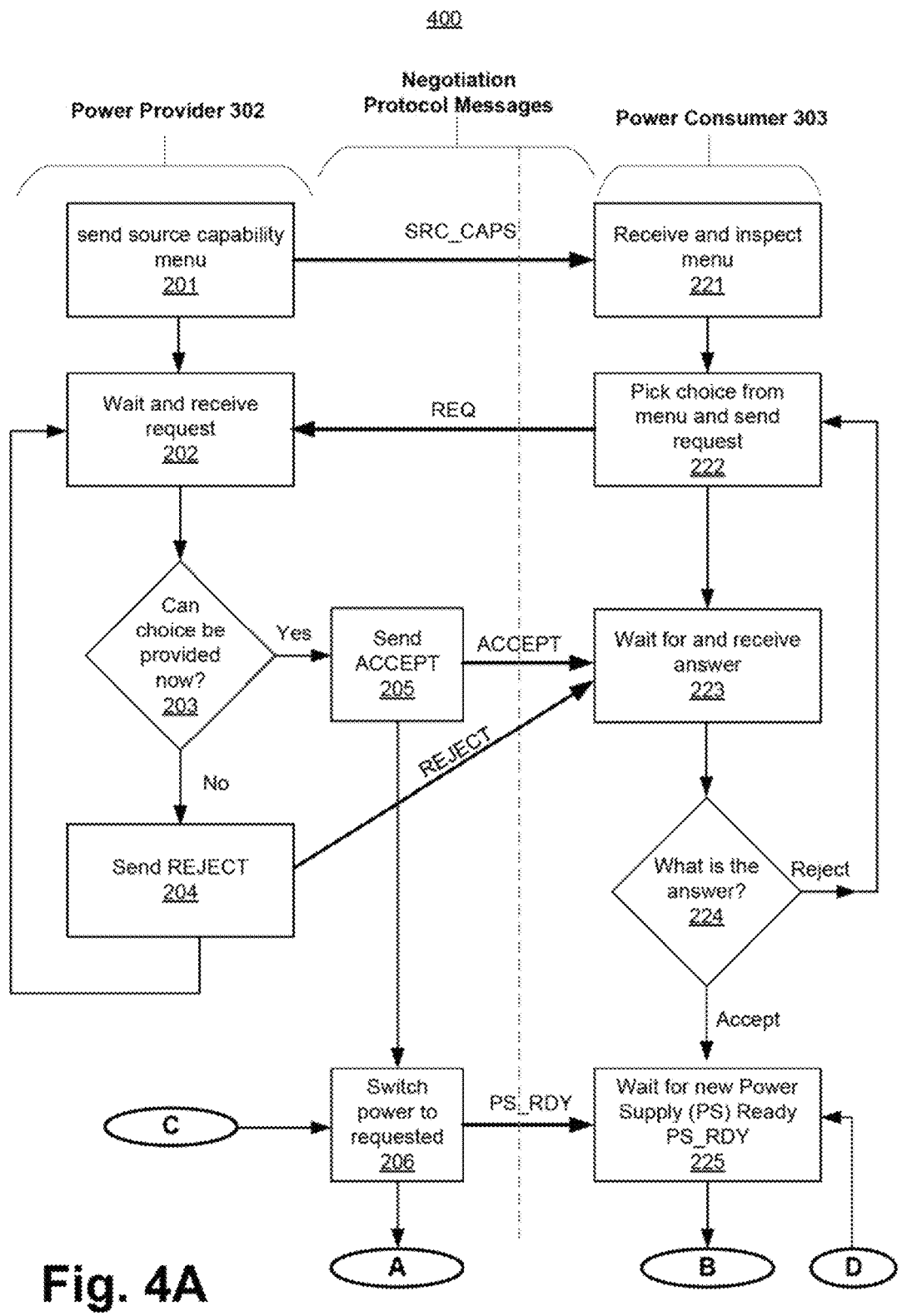
FIGS. 4A-B illustrate a plot showing the negotiation protocol for the USB power delivery system of FIG. 3, in accordance with some embodiments of the disclosure.
Figure 4B:
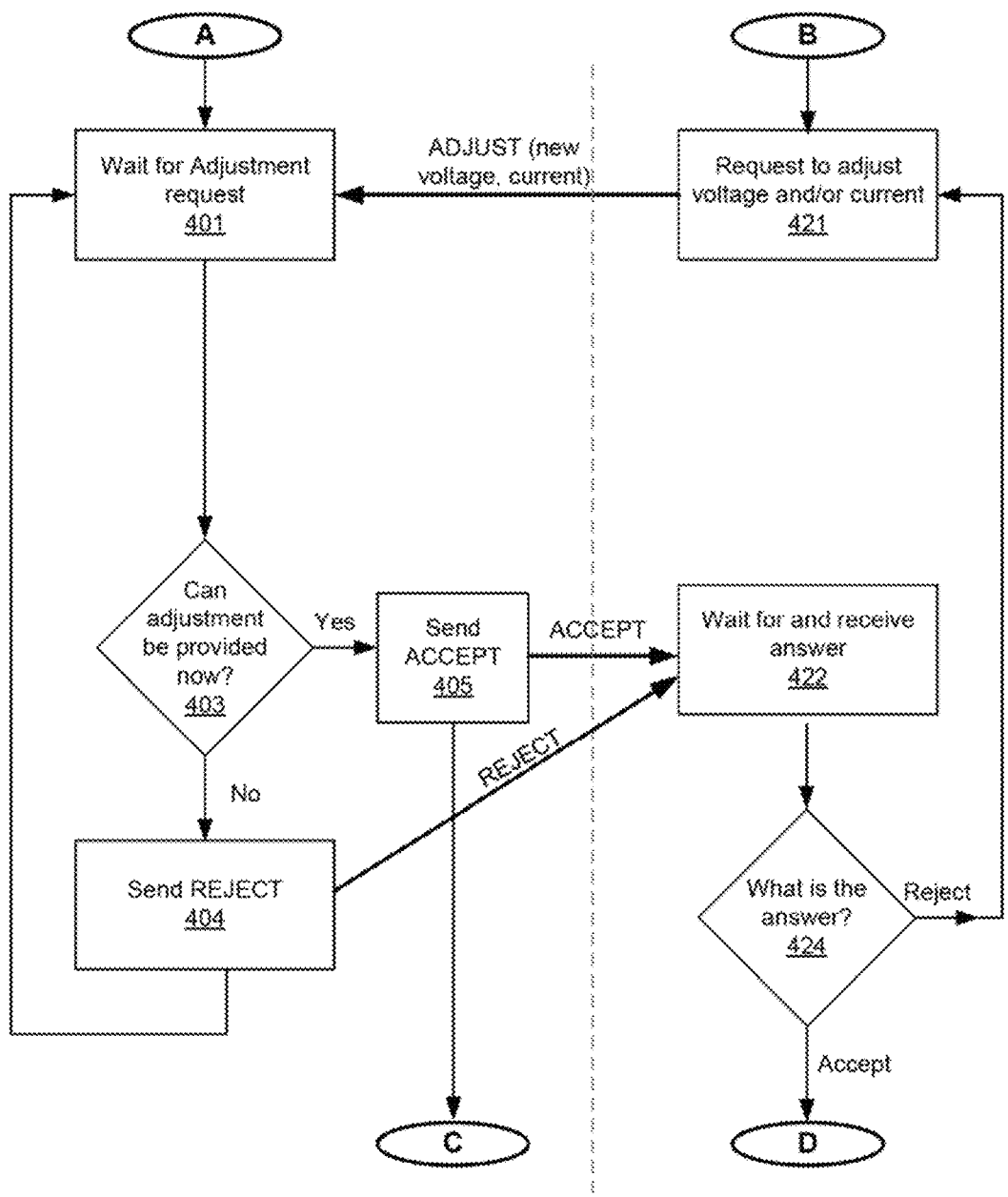

FIGS. 4A-B illustrate plot 400 showing the negotiation protocol for the USB power delivery system of FIG. 3, in accordance with some embodiments of the disclosure. It is pointed out that those elements of FIGS. 4A-B having the same reference numbers (or names) as the elements of any other figure can operate or function in any manner similar to that described, but are not limited to such.

Although the blocks in the flowchart with reference to FIGS. 4A-B are shown in a particular order, the order of the actions can be modified. Thus, the illustrated embodiments can be performed in a different order, and some actions/blocks may be performed in parallel. Some of the blocks and/or operations listed in FIGS. 4A-B are optional in accordance with certain embodiments. The numbering of the blocks presented is for the sake of clarity and is not intended to prescribe an order of operations in which the various blocks must occur. Additionally, operations from the various flows may be utilized in a variety of combinations.

So as not to obscure plot 400, operations and blocks described with reference to FIG. 2 are not repeated again. After executing block 206, the process proceeds to block 401 as indicated by identifier 'A'. Likewise, after executing block 225, the process proceeds to block 421. The scenario of plot 400 illustrates the case where a Consumer device requests a new voltage or current level (dynamically or in real time) after PS_RDY is provided. However, this is just one example. In another case, after executing blocks 201 and 221, the process may begin with the flowchart of FIG. 4B. For example, after block 201 is executed, Provider 302 executes block 401, and after block 221 is executed, Consumer 303 executes block 421.

At block 401, Provider 302 waits for any new voltage and/or current adjustment request. In one example, after some time passes, Consumer 303 decides that its wants to adjust the voltage and/or current provided by an Adjustable Power Supply (e.g., Provider 302). As such, at block 421, Consumer 303 sends a new ADJUST message to Provider 302. This new ADJUST message can be defined by using one of the reserved Data Protocol Message Types of Table 6-3 of USB-PD 2.0.

Table 1 illustrates a modified Table 6-3 as Table 6-3' in which one of the reserved bits from Bits 0101-1110 is used to define the ADJUST message.

However, the term can be named any other name for dynamically requesting a power supply (e.g., voltage and/or current) adjustment.

At block 403, Provider 302 makes a determination whether it can provide the adjustment to the power supply. For example, Provider 302 ascertains from its voltage supplying capabilities whether the request can be handled by its voltage regulator. If Provider 302 can provide the adjustment in power supply, then the process proceeds to block 405. Otherwise the process proceeds to block 404 and a REJECT message it sent to Consumer 303. At block 405, Provider 302 sends an ACCEPT message to Consumer 303 and also proceeds to block 206 (as indicated by identifier 'C') so that it can send a PS_RDY message to Consumer 303. At block 404, Provider 302 sends a REJECT message to Consumer 303 and then proceeds to block 401.

At block 422, Consumer 303 waits for a message (either an ACCEPT OR REJECT message) from Provider 302. After Consumer 303 receives this message on the CC wire(s), it determines the message at block 424. If the message is an ACCEPT message, Consumer 303 proceeds to block 225 (as indicated by identifier 'D') and waits for the PS_RDY message and the new power supply (i.e., new voltage and/or current). Otherwise, the process proceeds to block 421. At block 421, Consumer 303 may try requesting another change in power supply or may inform the user or computer system that it cannot receive the new power supply.

Figure 5A:
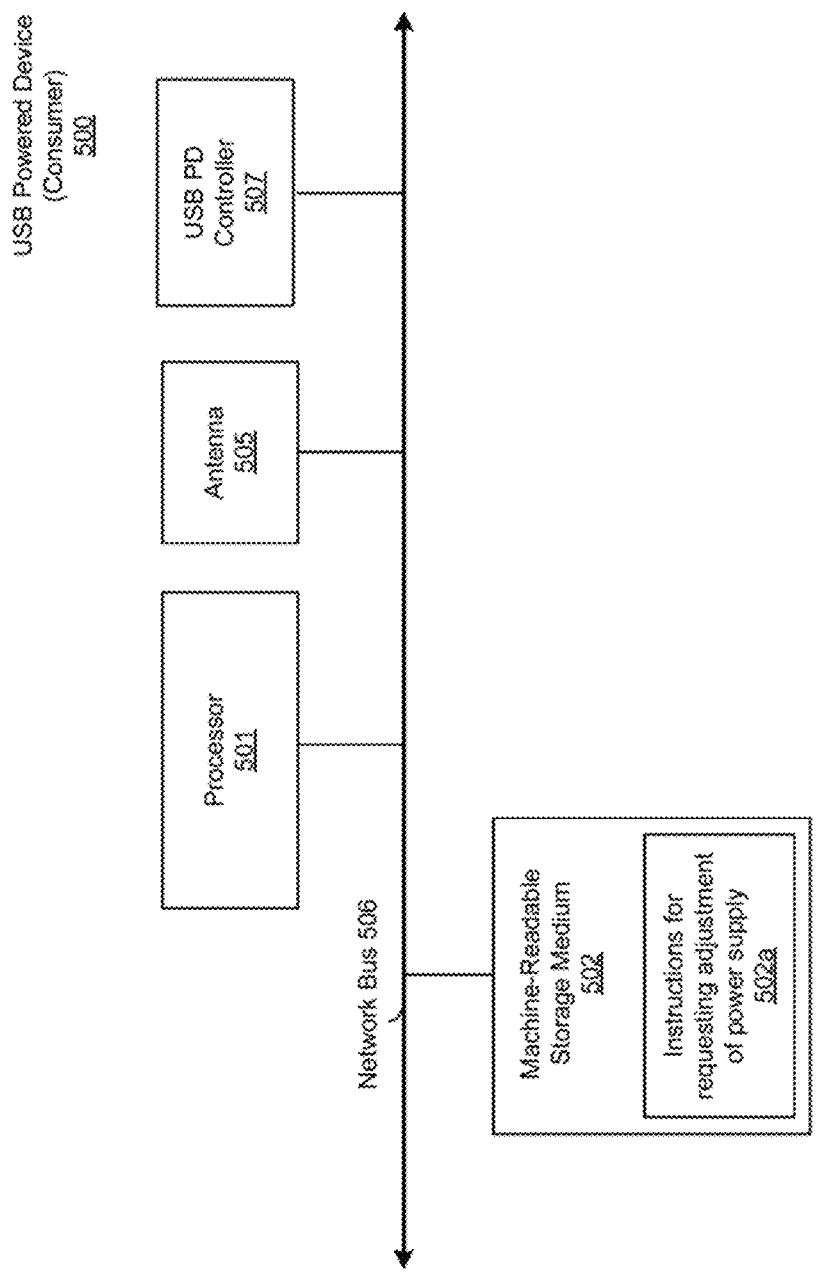
FIG. 5A illustrates a USB powered device with a machine readable storage media having instructions that when executed cause a machine (e.g., processor) to perform an operation for dynamically requesting adjustment in power supply.

FIG. 5A illustrates a USB powered device 500 (e.g., at least a part of Consumer 303) with a machine readable storage media having instructions that when executed cause a machine (e.g., processor) to perform an operation for dynamically requesting adjustment in power supply. It is pointed out that those elements of FIG. 5A having the same reference numbers (or names) as the elements of any other figure can operate or function in any manner similar to that described, but are not limited to such.

TABLE 1

6-3' Data Message Types

| Bits 3 ... 0 | Type | Sent by | Description | Valid Start of Packet |
|---|---|---|---|---|
| 0000 | Reserved | | All values not explicitly defined are Reserved and shall not be used | |
| 0001 | Source_Capabilities | Source or Dual-Role | See Section 6.4.1.2 | SOP only |
| 0010 | Request | Sink only | See Section 6.4.2 | SOP only |
| 0011 | BIST | Tester, Source or Sink | See Section 6.4.3 | SOP* |
| 0100 | Sink_Capabilities | Sink or Dual-Role | See Section 6.4.1.3 | SOP only |
| 0101 | ADJUST | Sink only | Request sent by Consumer to Provider to Adjust voltage and/or current to a new level | SOP |
| 0110-1110 | Reserved | | All values not explicitly defined are Reserved and shall not be used | |

In this example, Reserved Bit "0101" is used to define the ADJUST message. However, the embodiments are not limited to using this particular reserved bit. Any other reserved bit dedicated for Data Message Types may be used for defining the ADJUST message. The term "ADJUST" here indicates a message request type sent by Consumer 303 to Provider 302 for adjusting the power supply dynamically.

In some embodiments, USB powered device 500 (e.g., Consumer 303) comprises a low power Processor 501 (e.g., a Digital Signal Processor (DSP), an Application Specific Integrated Circuit (ASIC), a general purpose Central Processing Unit (CPU), or a low power logic implementing a simple finite state machine to perform the method of flowchart 400 associated with Consumer 303, etc.), Machine- Readable Storage Medium 502 (also referred to as tangible machine readable medium), Antenna 505, Network Bus 506, and USB PD Controller 507.

In some embodiments, the various logic blocks of Consumer 303 are coupled together via Network Bus 506. Any suitable protocol may be used to implement Network Bus 506. In some embodiments, Machine-Readable Storage Medium 502 includes Instructions 502*a* (also referred to as the program software code/instructions) for requesting and accepting a new power supply (e.g., new voltage and/or current) as described with reference to various embodiments and flowchart. Here, Instructions 502*a* are the instructions performed by Consumer 303 in flowchart 400 as described with reference to FIGS. 4A-B (e.g., instructions of blocks 221, 222, 223, 224, 225, 421, 422, and 424).

Program software code/instructions 502*a*, associated with Consumer 303 part of flowchart 400, as described with reference to FIGS. 4A-B, and executed to implement embodiments of the disclosed subject matter may be implemented as part of an operating system or a specific application, component, program, object, module, routine, or other sequence of instructions or organization of sequences of instructions referred to as "program software code/instructions," "operating system program software code/instructions," "application program software code/instructions," or simply "software" or firmware embedded in processor. In some embodiments, the program software code/instructions associated with Consumer 303 end of flowchart 400, as described with reference to FIGS. 4A-B, are executed by Consumer 303.

In some embodiments, the program software code/instructions 502*a* associated with flowchart 400 are stored in a computer executable storage medium 502 and executed by Processor 501. Here, computer executable storage medium 502 is a tangible machine readable medium that can be used to store program software code/instructions and data that, when executed by a computing device, causes one or more processors (e.g., Processor 501) to perform a method(s) as may be recited in one or more accompanying claims directed to the disclosed subject matter.

The tangible machine readable medium 502 may include storage of the executable software program code/instructions 502*a* and data in various tangible locations, including for example ROM, volatile RAM, non-volatile memory and/or cache and/or other tangible memory as referenced in the present application. Portions of this program software code/instructions 502*a* and/or data may be stored in any one of these storage and memory devices. Further, the program software code/instructions can be obtained from other storage, including, e.g., through centralized servers or peer to peer networks and the like, including the Internet. Different portions of the software program code/instructions and data can be obtained at different times and in different communication sessions or in the same communication session.

The software program code/instructions 502*a* (associated with Consumer 303 part of flowchart 400 as described with reference to FIGS. 4A-B and other embodiments) and data can be obtained in their entirety prior to the execution of a respective software program or application by the computing device. Alternatively, portions of the software program code/instructions 502*a* and data can be obtained dynamically, e.g., just in time, when needed for execution. Alternatively, some combination of these ways of obtaining the software program code/instructions 502*a* and data may occur, e.g., for different applications, components, programs, objects, modules, routines or other sequences of instructions or organization of sequences of instructions, by way of example. Thus, it is not required that the data and instructions be on a tangible machine readable medium in entirety at a particular instance of time.

Examples of tangible computer-readable media 502 include but are not limited to recordable and non-recordable type media such as volatile and non-volatile memory devices, read only memory (ROM), random access memory (RAM), flash memory devices, floppy and other removable disks, magnetic storage media, optical storage media (e.g., Compact Disk Read-Only Memory (CD ROMS), Digital Versatile Disks (DVDs), etc.), among others. The software program code/instructions may be temporarily stored in digital tangible communication links while implementing electrical, optical, acoustical or other forms of propagating signals, such as carrier waves, infrared signals, digital signals, etc. through such tangible communication links.

In general, tangible machine readable medium 502 includes any tangible mechanism that provides (i.e., stores and/or transmits in digital form, e.g., data packets) information in a form accessible by a machine (i.e., a computing device), which may be included, e.g., in a communication device, a computing device, a network device, a personal digital assistant, a manufacturing tool, a mobile communication device, whether or not able to download and run applications and subsidized applications from the communication network, such as the Internet, e.g., an iPhone®, Galaxy®, Blackberry® Droid®, or the like, or any other device including a computing device. In one embodiment, processor-based system is in a form of or included within a PDA (personal digital assistant), a cellular phone, a notebook computer, a tablet, a game console, a set top box, an embedded system, a TV (television), a personal desktop computer, etc. Alternatively, the traditional communication applications and subsidized application(s) may be used in some embodiments of the disclosed subject matter.

Here, Antenna 505 can be any antenna. For example, in some embodiments, Antenna 505 may comprise one or more directional or omnidirectional antennas, including monopole antennas, dipole antennas, loop antennas, patch antennas, microstrip antennas, coplanar wave antennas, or other types of antennas suitable for transmission of RF (Radio Frequency) signals. In some multiple-input-multiple-output (MIMO) embodiments, Antenna(s) 505 are separated to take advantage of spatial diversity.

Figure 5B:
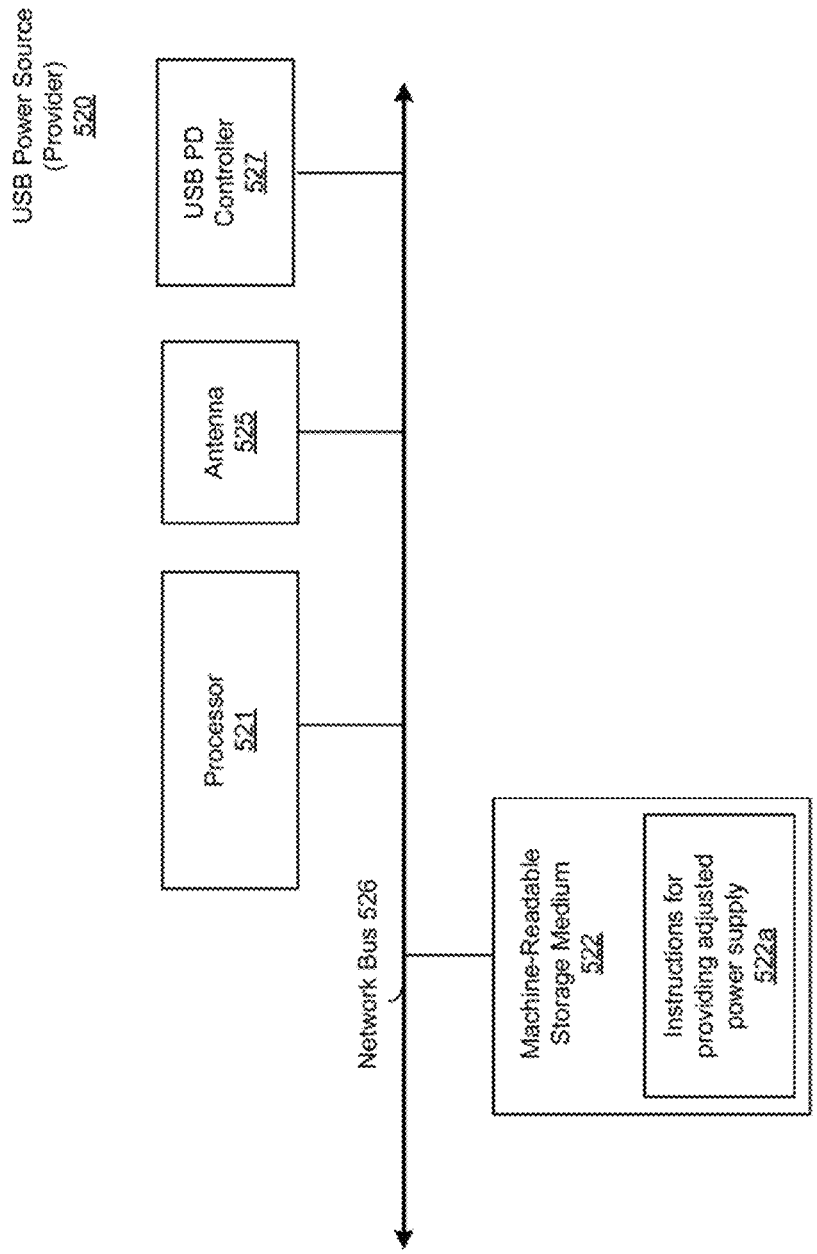
FIG. 5B illustrates an adjustable USB power source with a machine readable storage media having instructions that when executed cause a machine (e.g., processor) to perform an operation for dynamically providing an adjusted power supply upon request.

FIG. 5B illustrates an adjustable USB power source 520 (e.g., at least part of Provider 302) with a machine readable storage media having instructions that when executed cause a machine (e.g., processor) to perform an operation for dynamically providing adjusted power supply upon request. It is pointed out that those elements of FIG. 5B having the same reference numbers (or names) as the elements of any other figure can operate or function in any manner similar to that described, but are not limited to such.

In some embodiments, adjustable USB power source 520 (e.g., part of Provider 302) comprises a low power Processor 521 (e.g., a DSP, an ASIC, a general purpose CPU, or a low power logic implementing a simple finite state machine to perform the method of flowchart 400 associated with Provider 302, etc.), Machine-Readable Storage Medium 522 (also referred to as tangible machine readable medium), Antenna 525, Network Bus 526, and USB PD Controller 527.

In some embodiments, the various logic blocks of Provider 302 are coupled together via Network Bus 526. Any suitable protocol may be used to implement Network Bus 526. In some embodiments, Machine-Readable Storage Medium 522 includes Instructions 522*a* (also referred to as the program software code/instructions) for requesting and accepting a new power supply (e.g., new voltage and/or current) as described with reference to various embodiments and flowchart. Here, Instructions 522a are the instructions performed by Provider 302 in flowchart 400 as described with reference to FIGS. 4A-B (e.g., instructions of blocks 201, 202, 203, 204, 205, 206, 401, 403, 404, and 405).

Program software code/instructions 522a, associated with Provider 302 of flowchart 400, as described with reference to FIGS. 4A-B, and executed to implement embodiments of the disclosed subject matter may be implemented as part of an operating system or a specific application, component, program, object, module, routine, or other sequence of instructions or organization of sequences of instructions referred to as "program software code/instructions," "operating system program software code/instructions," "application program software code/instructions," or simply "software" or firmware embedded in processor. In some embodiments, the program software code/instructions associated with Provider 302 of flowchart 400, as described with reference to FIGS. 4A-B, are executed by Processor or logic (e.g., finite state machine) 521 of Provider 302.

In some embodiments, the program software code/instructions 522a associated with flowchart 400 are stored in a computer executable storage medium 522 and executed by Processor 521. Here, computer executable storage medium 522 is a tangible machine readable medium that can be used to store program software code/instructions and data that, when executed by a computing device, causes one or more processors (e.g., Processor 521) to perform a method(s) as may be recited in one or more accompanying claims directed to the disclosed subject matter.

The tangible machine readable medium 522 may include storage of the executable software program code/instructions 522a and data in various tangible locations, including for example ROM, volatile RAM, non-volatile memory and/or cache and/or other tangible memory as referenced in the present application. Portions of this program software code/instructions 522a and/or data may be stored in any one of these storage and memory devices. Further, the program software code/instructions can be obtained from other storage, including, e.g., through centralized servers or peer to peer networks and the like, including the Internet. Different portions of the software program code/instructions and data can be obtained at different times and in different communication sessions or in the same communication session.

The software program code/instructions 522a (associated with Provider 302 of flowchart 400 as described with reference to FIGS. 4A-B and other embodiments) and data can be obtained in their entirety prior to the execution of a respective software program or application by the computing device. Alternatively, portions of the software program code/instructions 522a and data can be obtained dynamically, e.g., just in time, when needed for execution. Alternatively, some combination of these ways of obtaining the software program code/instructions 522a and data may occur, e.g., for different applications, components, programs, objects, modules, routines or other sequences of instructions or organization of sequences of instructions, by way of example. Thus, it is not required that the data and instructions be on a tangible machine readable medium in entirety at a particular instance of time.

Examples of tangible computer-readable media 522 include but are not limited to recordable and non-recordable type media such as volatile and non-volatile memory devices, read only memory (ROM), random access memory (RAM), flash memory devices, floppy and other removable disks, magnetic storage media, optical storage media (e.g., Compact Disk Read-Only Memory (CD ROMS), Digital Versatile Disks (DVDs), etc.), among others. The software program code/instructions may be temporarily stored in digital tangible communication links while implementing electrical, optical, acoustical or other forms of propagating signals, such as carrier waves, infrared signals, digital signals, etc. through such tangible communication links.

In general, tangible machine readable medium 522 includes any tangible mechanism that provides (i.e., stores and/or transmits in digital form, e.g., data packets) information in a form accessible by a machine (i.e., a computing device), which may be included, e.g., in a communication device, a computing device, a network device, a personal digital assistant, a manufacturing tool, a mobile communication device, whether or not able to download and run applications and subsidized applications from the communication network, such as the Internet, e.g., an iPhone®, Galaxy®, Blackberry® Droid®, or the like, or any other device including a computing device. In one embodiment, processor-based system is in a form of or included within a PDA (personal digital assistant), a cellular phone, a notebook computer, a tablet, a game console, a set top box, an embedded system, a TV (television), a personal desktop computer, etc. Alternatively, the traditional communication applications and subsidized application(s) may be used in some embodiments of the disclosed subject matter.

Here, Antenna 525 can be any antenna. For example, in some embodiments, Antenna 525 may comprise one or more directional or omnidirectional antennas, including monopole antennas, dipole antennas, loop antennas, patch antennas, microstrip antennas, coplanar wave antennas, or other types of antennas suitable for transmission of RF signals. In some MIMO embodiments, Antenna(s) 525 are separated to take advantage of spatial diversity.

Figure 6:
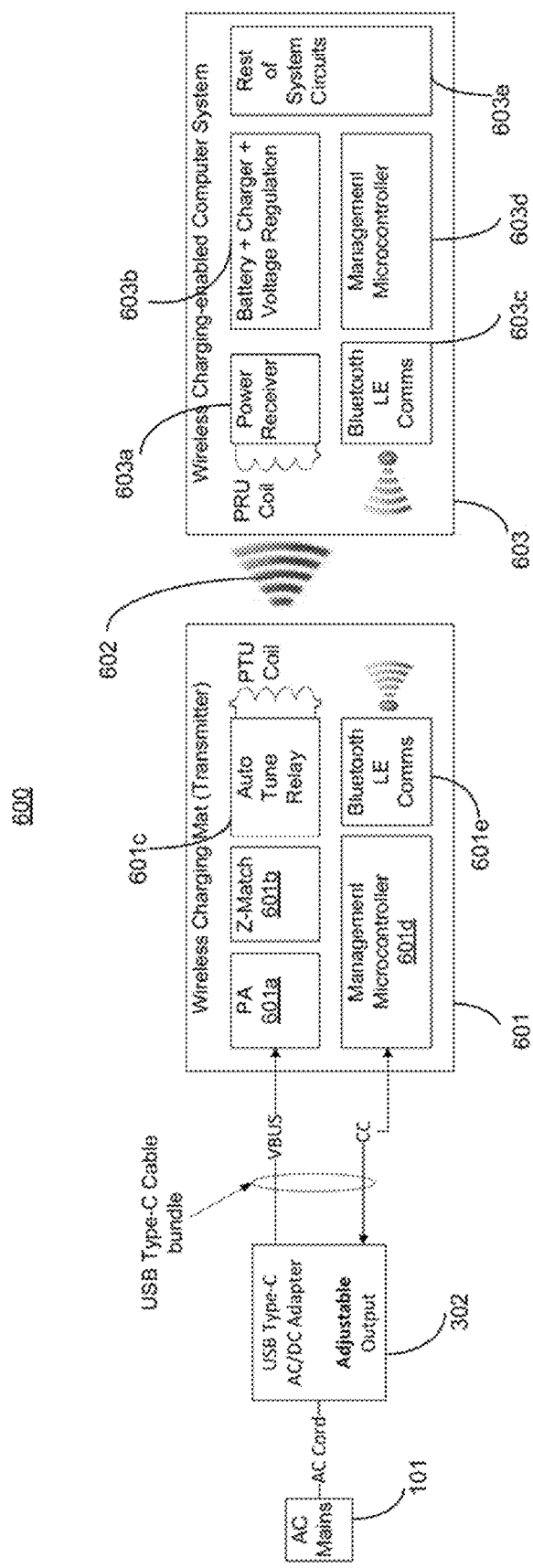
FIG. 6 illustrates a USB power delivery system using an adjustable power source in a wireless charging environment, in accordance with some embodiments of the disclosure.

FIG. 6 illustrates a USB power delivery system 600 using an adjustable power source in a wireless charging environment, in accordance with some embodiments of the disclosure. It is pointed out that those elements of FIG. 6 having the same reference numbers (or names) as the elements of any other figure can operate or function in any manner similar to that described, but are not limited to such.

In some embodiments, USB power delivery system 600 comprises AC Main 101, Provider 302, Wireless Charging Mat Transmitter (Tx) 601, and Wireless Charging-enabled Computer System 603. In some embodiments, Wireless Charging Mat Transmitter (Tx) 601 comprises Power Amplifier (PA) 601a, Impedance Matching stage 601b, Auto Tune Relay 601c, Management Microcontroller 601d (e.g., system 500), Bluetooth Low Energy (LE) compliant Communication module 601e, and Power Transmitter Unit (PTU) Coil. The Auto Tune Relay 601c together with the PTU Coil sends power 602 wirelessly to Wireless Charging-enabled Computer System 603, in accordance with some embodiments.

In some embodiments, radio frequency Power Amplifier (PA 601a) is a type of electronic amplifier used to convert a low-power signal into a larger signal of significant power, typically for driving the antenna of a transmitter. In some embodiments, Impedance Matching (Z-Match 601b) provides an output impedance of a signal source to match with the physical impedance characteristics of an antenna in order to maximize the power transfer and/or minimize the signal reflection. In some embodiments, Auto Tune Relay 601c is a switching circuit that automatically adjusts the frequency of a radio transmission. In some embodiments, the PTU Coil is a wire winding, typically circular, oval, or rectangular, which acts as the antenna for the transmission of wireless power. In some embodiments, a Management Microcontroller 601*d* is a general-purpose microprocessor embedded with firmware which is able to execute code (e.g., code to manage the Power Delivery algorithms and communications for a device). In some embodiments, Bluetooth LE Communications module 601*e* is a kind of radio by which two devices may exchange data messages (e.g., Power Delivery management messages).

In some embodiments, Wireless Charging-enabled Computer System 603 comprises: Power Receiver Unit (PRU) Coil, Power Receiver 603*a*, Voltage Regulation module 603*b* (e.g., Battery, Charger, low-dropout regulator, etc.), Bluetooth LE Communication module 603*c*, Management Microcontroller 603*d*, and Rest of System Circuits 603*e*. In some embodiments, the PRU Coil receives the power 602 transmitted by PTU Coil of Tx 601*c*.

In some embodiments, the PRU Coil is a wire winding, typically circular, oval, or rectangular, which acts as the antenna for the reception of wireless power. In some embodiments, a Battery (e.g., part of 603*b*) is provided which is a reservoir for the storage of electrical power until later use is required. In some embodiments, a Charger (part of 603*b*) is provided which is an electronic circuit that uses methods for the optimal insertion and storage of electrical charge into the Battery. In some embodiments, a voltage regulator (part of 603*b*) is provided which is provides voltage regulation to constrain the delivery of a voltage to a load circuit to within a narrow range (for example, ±5) even over a wide range of load conditions (for example, the current demands of the load circuit rise and fall dynamically). The input of the voltage regulator may be close to the target output voltage (e.g., input=+5V±20% and output=+5V±5%) or it may be a very different voltage (e.g., "buck regulator": input=+20V±20% and output=+5V±5%, or "boost regulator": input=+3.3V±10% and output=+9V±5%).

In some embodiments, Management Microcontroller 603*d* is provided which is a general-purpose microprocessor embedded with firmware which is able to execute code (e.g., code to manage the Power Delivery algorithms and communications for a device). In some embodiments, Bluetooth LE Communications module 603*c* is provided which is an example of one kind of radio by which two devices may exchange data messages (e.g., Power Delivery management messages).

In some embodiments, power efficiency information collected by/from the PRU is passed over Bluetooth LE Comm. 603*c* from Management Microcontroller 603*d* to Management Microcontroller 601*d* of Wireless Charging Mat 601. Here, power efficiency generally refers to the power provided by Provider 302 over VBUS compared to the power 602 transmitted by Wireless Charging Mat 601.

For example, in a fully efficient power system, the power provided by Provider 302 is equal to the power 602 transmitted by Wireless Charging Mat 601. When power 602 is less than the power on VBUS, then power efficiency is low. One reason for lower power efficiency is when there is a physical proximity offset between PTU Coil and PRU Coil. Power efficiency can improve (e.g., increase) when the offset between the PTU Coil and PRU Coil is close to zero (e.g., when the PTU Coil of Wireless Charging Mat 601 is exactly below or above the PRU Coil of Wireless Charging enabled Computer System 603).

In some embodiments, in response to this power efficiency information, Management Microcontroller 603*d* sends a request for a more optimal power level to Management Microcontroller 601*d* over Bluetooth LE, whereupon Management Microcontroller 601*d* sends the ADJUST message (according to the ADJUST message protocol discussed with reference to FIGS. 3-4) over the CC line(s) of the USB Type-C Cable bundle to Provider 302. Referring back to FIG. 6, in some embodiments, Provider 302 adjusts its voltage and/or current output and supplies it to Wireless Charging Mat 601 over VBUS to better meet the needs determined by the analysis at the PRU. As such, power efficiency is brought closer to or at one.

Figure 7:
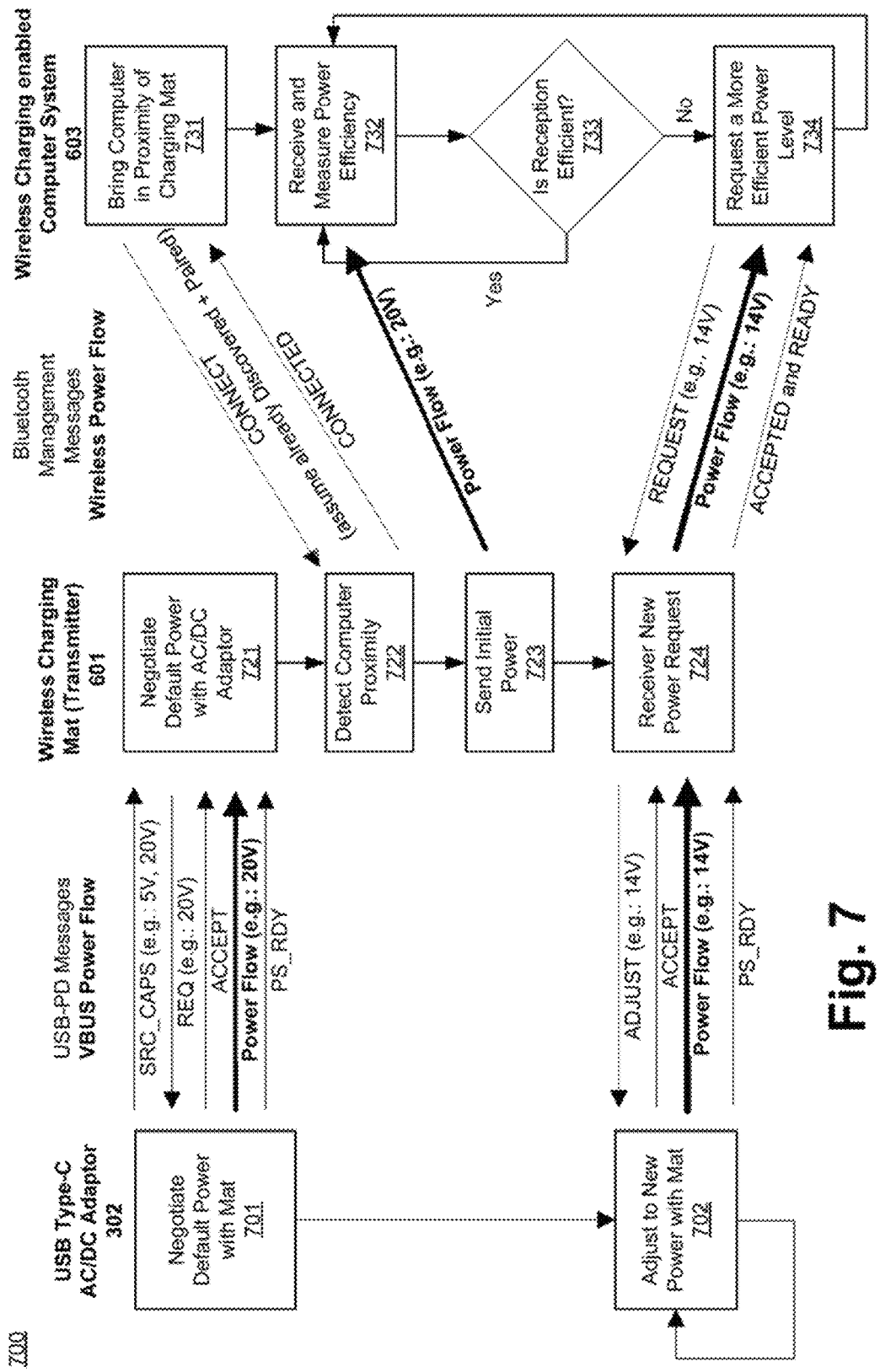
FIG. 7 illustrates a plot showing the negotiation protocol for the USB power delivery system of FIG. 6, in accordance with some embodiments of the disclosure.

FIG. 7 illustrate plot 700 showing the negotiation protocol for the USB power delivery system of FIG. 6, in accordance with some embodiments of the disclosure. It is pointed out that those elements of FIG. 7 having the same reference numbers (or names) as the elements of any other figure can operate or function in any manner similar to that described, but are not limited to such.

Although the blocks in the flowchart with reference to FIG. 7 are shown in a particular order, the order of the actions can be modified. Thus, the illustrated embodiments can be performed in a different order, and some actions/blocks may be performed in parallel. Some of the blocks and/or operations listed in FIG. 7 are optional in accordance with certain embodiments. The numbering of the blocks presented is for the sake of clarity and is not intended to prescribe an order of operations in which the various blocks must occur. Additionally, operations from the various flows may be utilized in a variety of combinations.

Plot 700 shows operations performed by Provider 302, Wireless Charging Mat 601, and Wireless Charging enabled Computer System 603. Plot 700 also shows the associated messaging between Provider 302, Wireless Charging Mat 601, and Wireless Charging enabled Computer System 603.

At block 701, Provider 302 sends Source_Capabilities (SRC_CAPS) message to Wireless Charging Mat 601. At block 721, Wireless Charging Mat 601 reviews the message and sends a request (REQ) for a power supply level (e.g., 20V) to Provider 302. At block 701, Provider 302 reviews the request and if it accepts it, it sends an ACCEPT message to Wireless Charging Mat 601. Following the ACCEPT message, Provider 302 sends a Power Ready (PS_RDY) message and provides the requested power (i.e., Power Flow) via VBUS to Wireless Charging Mat 601. Here, blocks 701 and 721 summarize the same protocol as discussed with reference to blocks 201-206 and 221-225 of FIG. 4A without repeating all the details.

Referring back to FIG. 7, at block 731, Wireless Charging enabled computer System 603 moves close to Wireless Charging Mat 601. For example, Wireless Charging enabled Computer System 603 comes in close proximity to Wireless Charging Mat 601 such that Wireless Charging enabled Computer System 603 can receive power transmitted wirelessly from Wireless Charging Mat 601.

At block 722, Wireless Charging Mat 601 detects close proximity (e.g., 0 to 3 centimeters) of Wireless Charging enabled Computer System 603. So as not to obscure the embodiments, Wireless Charging Mat 601 and Wireless Charging enabled Computer System 603 are assumed to be discovered and paired using any known pairing technology. For example, Wireless Charging enabled Computer System 603 sends a Bluetooth LE CONNECT message to Wireless Charging Mat 601, and after proper authentication, at block 731, Wireless Charging Mat 601 sends a CONNECTED or ACKNOWLEDGE (ACK) message to Wireless Charging enabled Computer System 603.

At block 723, Wireless Charging Mat 601 sends an initial power supply 602 wirelessly via the PTU Coil to the PRU Coil of Wireless Charging enabled Computer System 603. For example, a power flow of 20V is wirelessly provided to Wireless Charging enabled Computer System 603. At block 732, Wireless Charging enabled Computer System 603 measures the power efficiency. For example, Receiver 603a compares the power provided by Provider 302 via VBUS to the Power received by Wireless Charging Mat 601.

At block 733, Wireless Charging enabled Computer System 603 makes a determination whether the power efficiency is above a threshold (e.g., 30%). For example, Management Microcontroller 603d compares the measured power efficiency against a fixed/predetermined or programmable threshold. If Wireless Charging enabled Computer System 603 determines that the power efficiency is low (e.g., below 30%), then Wireless Charging enabled Computer System 603 requests Wireless Charging Mat 601 to send a more efficient power supply as indicate by block 734.

For example, if Wireless Charging enabled Computer System 603 only needs 14V but 20V is being provided by Wireless Charging Mat, then the remaining power is wasted as heat leading to low power efficiency. Continuing with this example, Wireless Charging enabled Computer System 603 sends a REQUEST of a lower power supply level.

In some embodiments, the power adjustment determination for achieving better power efficiency is made based on wireless power delivery efficiency resulting from the relative spatial alignment of the PTU and the PRU. In some embodiments, the adjustment determination for achieving better power efficiency is made based on an optimal battery charging efficiency of system 603. In some embodiments, the adjustment determination for achieving better power efficiency is made based on real-time power consumption needs of system 603 under different software demand scenarios, including at least one of: "idle," "web browsing," and "video playback".

In some embodiments, in response to the REQUEST, Wireless Charging Mat 601 sends the ADJUST message (described with reference to FIGS. 3-4) to Provider 302 to lower its power supply provision. At block 702, Provider 302 determines if it can service the request. If Provider 302 determines that it cannot service the request, Provider 302 waits for another request and sends a REJECT message to Wireless Charging Mat 601. If Provider 302 determines that it can accept the request for adjustment in power supply, it sends an ACCEPT message to Wireless Charging Mat 601. The ACCEPT message follows a power ready message (PS_RDY) and the adjusted power supply (e.g., 14V) is provided to Wireless Charging Mat 601. Here, blocks 702 and 724 summarize the same protocol as discussed with reference to blocks 401-405 and 204, and 421-424 and 225 of FIGS. 4A-B without repeating all the details.

Referring back to FIG. 7, at block 724, Wireless Charging Mat 601 sends an ACCEPTED and/or READY message to Wireless Charging enabled Computer System 603 indicating that Wireless Charging Mat 601 can provide the new requested power supply. Wireless Charging Mat 601 then transmits a new power supply 602 wirelessly to Wireless Charging enabled Computer System 603. With this new power supply, power efficiency of Wireless Charging enabled Computer System 603 improves (e.g., gets closer to 100%).

Figure 8:
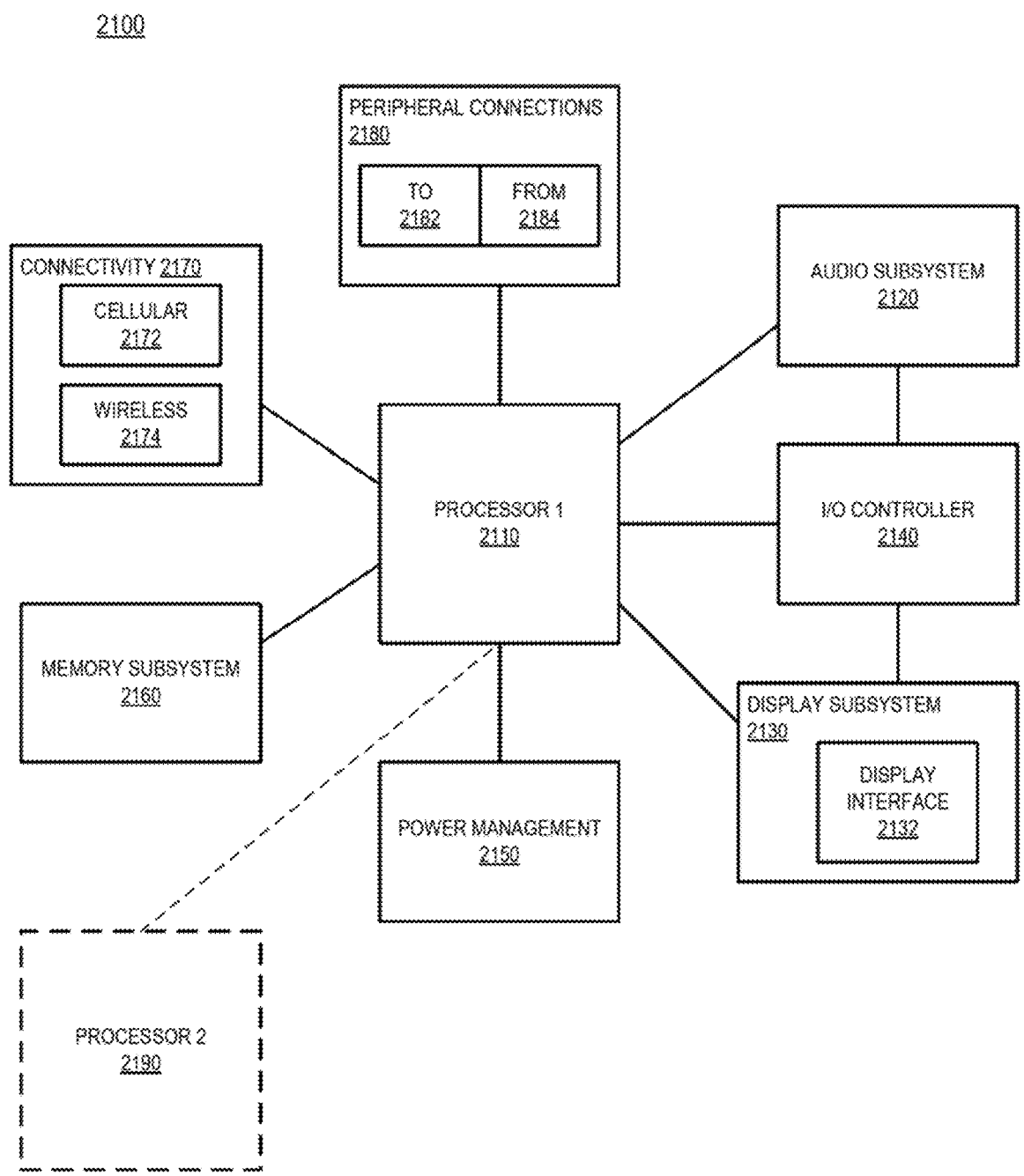
FIG. 8 illustrates a USB compliant smart device (e.g., Provider, Consumer, or Charging Mat) or a computer system or a SoC (System-on-Chip) having logic to dynamically request and receive adjustable power supply from an adjustable USB power source, or logic to dynamically receive a request for new power supply and to dynamically provide the new power supply, according to some embodiments.

FIG. 8 illustrates a USB compliant smart device 2100 (e.g., Provider, Consumer, or Charging Mat) or a computer system or a SoC (System-on-Chip) having logic to dynamically request and receive adjustable power supply from an adjustable USB power source, or logic to dynamically receive a request for new power supply and to dynamically provide the new power supply, according to some embodiments. It is pointed out that those elements of FIG. 8 having the same reference numbers (or names) as the elements of any other figure can operate or function in any manner similar to that described, but are not limited to such.

FIG. 8 illustrates a block diagram of an embodiment of a mobile device in which flat surface interface connectors could be used. In some embodiments, computing device 2100 represents a mobile computing device, such as a computing tablet, a mobile phone or smart-phone, a wireless-enabled e-reader, or other wireless mobile device. It will be understood that certain components are shown generally, and not all components of such a device are shown in computing device 2100.

In some embodiments, computing device 2100 includes a first processor 2110 having interconnects and transistors with engineered corner regions for improving carrier flow, according to some embodiments discussed. Other blocks of the computing device 2100 may also include interconnects and transistors with engineered corner regions for improving carrier flow of some embodiments. The various embodiments of the present disclosure may also comprise a network interface within 2170 such as a wireless interface so that a system embodiment may be incorporated into a wireless device, for example, cell phone or personal digital assistant.

In one embodiment, processor 2110 (and/or processor 2190) can include one or more physical devices, such as microprocessors, application processors, microcontrollers, programmable logic devices, or other processing means. The processing operations performed by processor 2110 include the execution of an operating platform or operating system on which applications and/or device functions are executed. The processing operations include operations related to I/O (input/output) with a human user or with other devices, operations related to power management, and/or operations related to connecting the computing device 2100 to another device. The processing operations may also include operations related to audio I/O and/or display I/O.

In one embodiment, computing device 2100 includes audio subsystem 2120, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 2100, or connected to the computing device 2100. In one embodiment, a user interacts with the computing device 2100 by providing audio commands that are received and processed by processor 2110.

Display subsystem 2130 represents hardware (e.g., display devices) and software (e.g., drivers) components that provide a visual and/or tactile display for a user to interact with the computing device 2100. Display subsystem 2130 includes display interface 2132, which includes the particular screen or hardware device used to provide a display to a user. In one embodiment, display interface 2132 includes logic separate from processor 2110 to perform at least some processing related to the display. In one embodiment, display subsystem 2130 includes a touch screen (or touch pad) device that provides both output and input to a user.

I/O controller 2140 represents hardware devices and software components related to interaction with a user. I/O controller 2140 is operable to manage hardware that is part of audio subsystem 2120 and/or display subsystem 2130. Additionally, I/O controller 2140 illustrates a connection point for additional devices that connect to computing device 2100 through which a user might interact with the system. For example, devices that can be attached to the computing device 2100 might include microphone devices, speaker or stereo systems, video systems or other display devices, keyboard or keypad devices, or other I/O devices for use with specific applications such as card readers or other devices.

As mentioned above, I/O controller 2140 can interact with audio subsystem 2120 and/or display subsystem 2130. For example, input through a microphone or other audio device can provide input or commands for one or more applications or functions of the computing device 2100. Additionally, audio output can be provided instead of, or in addition to display output. In another example, if display subsystem 2130 includes a touch screen, the display device also acts as an input device, which can be at least partially managed by I/O controller 2140. There can also be additional buttons or switches on the computing device 2100 to provide I/O functions managed by I/O controller 2140.

In one embodiment, I/O controller 2140 manages devices such as accelerometers, cameras, light sensors or other environmental sensors, or other hardware that can be included in the computing device 2100. The input can be part of direct user interaction, as well as providing environmental input to the system to influence its operations (such as filtering for noise, adjusting displays for brightness detection, applying a flash for a camera, or other features).

In one embodiment, computing device 2100 includes power management 2150 that manages battery power usage, charging of the battery, and features related to power saving operation. Memory subsystem 2160 includes memory devices for storing information in computing device 2100. Memory can include nonvolatile (state does not change if power to the memory device is interrupted) and/or volatile (state is indeterminate if power to the memory device is interrupted) memory devices. Memory subsystem 2160 can store application data, user data, music, photos, documents, or other data, as well as system data (whether long-term or temporary) related to the execution of the applications and functions of the computing device 2100.

Elements of embodiments are also provided as a machine-readable medium (e.g., memory 2160) for storing the computer-executable instructions (e.g., instructions to implement any other processes discussed herein). The machine-readable medium (e.g., memory 2160) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 2170 includes hardware devices (e.g., wireless and/or wired connectors and communication hardware) and software components (e.g., drivers, protocol stacks) to enable the computing device 2100 to communicate with external devices. The computing device 2100 could be separate devices, such as other computing devices, wireless access points or base stations, as well as peripherals such as headsets, printers, or other devices.

Connectivity 2170 can include multiple different types of connectivity. To generalize, the computing device 2100 is illustrated with cellular connectivity 2172 and wireless connectivity 2174. Cellular connectivity 2172 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 2174 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 2180 include hardware interfaces and connectors, as well as software components (e.g., drivers, protocol stacks) to make peripheral connections. It will be understood that the computing device 2100 could both be a peripheral device ("to" 2182) to other computing devices, as well as have peripheral devices ("from" 2184) connected to it. The computing device 2100 commonly has a "docking" connector to connect to other computing devices for purposes such as managing (e.g., downloading and/or uploading, changing, synchronizing) content on computing device 2100. Additionally, a docking connector can allow computing device 2100 to connect to certain peripherals that allow the computing device 2100 to control content output, for example, to audiovisual or other systems.

In addition to a proprietary docking connector or other proprietary connection hardware, the computing device 2100 can make peripheral connections 1680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

For example, an apparatus is provided which comprises: an adjustable power supply source to generate an adjustable power supply; a node to provide the adjustable power supply to a device; and a bus which is operable to: send a first message to the device, the first message is to indicate that the adjustable power supply source is capable of dynamically providing an adjustable power supply; and receive a request from the device, the request is to indicate a new voltage or current specification.

In some embodiments, the bus is operable to: send a second message to the device, the second message is to indicate that the requested new voltage or current specification was accepted or rejected. In some embodiments, the bus is operable to: send a third message to the device, the third message is to indicate that the requested new voltage or current specification is now activated and ready. In some embodiments, the request is defined in a reserve bit of a Data Protocol Message Type of a Universal Serial Bus (USB) Power Delivery Specification.

In some embodiments, the first message is based on a reserved bit setting in a list of Types of Power Sources of a Universal Serial Bus (USB) Power Delivery Specification. In some embodiments, the adjustable power supply source is operable to generate one of: a fixed power supply; a power supply for charging a battery; or a variable power supply. In some embodiments, the adjustable power supply source is a Universal Serial Bus (USB) Power Delivery compliant power source.

In some embodiments, the node and bus are Universal Serial Bus (USB) Power Delivery compliant. In some embodiments, the node and bus are either part of a USB Type-C cable or coupled with a USB Type-C cable. In some embodiments, the device is a wireless charging mat.

In another example, a system is provided which comprises: a memory; a processor coupled to the memory, the processor including an apparatus which is to: dynamically send a first request to a power source to adjust a power supply for the processor, the power source being external to the system; and receive a power ready signal from the power source when the power source is to provide the adjusted power supply to the processor; and a wireless interface which is to allow the processor to communicate with another device.

In some embodiments, the system comprises a power transmitter unit (PTU) to transmit power to another device. In some embodiments, the other device has a power receiver unit (PRU). In some embodiments, the processor is operable to send a second request to the power source when it is determined that the PTU is to adjust its wireless power transmission. In some embodiments, the adjustment determination is made based on wireless power delivery efficiency resulting from the relative spatial alignment of the PTU and the PRU.

In some embodiments, the adjustment determination is made based on an optimal battery charging efficiency of the system. In some embodiments, the adjustment determination is made based on real-time power consumption needs of the system under different software demand scenarios, including at least one of: "idle," "web browsing," and "video playback".

In another example, a machine readable storage media is provided having machine readable instructions that when executed cause a machine to perform an operation which comprises: send a first message to a device over a bus, the first message is to indicate an adjustable power source nature of an apparatus; receive a first request from the device over the bus, the request is to indicate a new voltage or current specification; and determine whether the adjustable power source can meet the request, and to send a decision of the determination to the device.

In some embodiments, the machine readable storage media has machine readable instructions that when executed cause the machine to perform an operation which comprises: send a second message to the device, the second message is to indicate that the requested new voltage or current specification based power supply is being provided to the device. In some embodiments, the first message is a Source_Capabilities message of a Universal Serial Bus (USB) Power Delivery Specification, and wherein the second message is a Power Supply Ready message of the USB Power Delivery Specification.

In some embodiments, the machine readable storage media having machine readable instructions that when executed cause the machine to perform an operation which comprises: receive a second request to provide a fixed power supply; and provide a fixed power supply to the device in response to the second request. In some embodiments, the machine readable storage media has machine readable instructions that when executed cause the machine to perform an operation which comprises: receive a third request to provide a power supply to charge a battery; and provide a power supply to the battery in response to the third request.

In some embodiments, the machine readable storage media of claim has machine readable instructions that when executed cause the machine to perform an operation which comprises: receive a fourth request to provide a variable power supply; and provide a variable power supply to the device in response to the fourth request.

In another example, a machine readable storage media is provided having machine readable instructions that when executed cause a machine to perform an operation which comprises: receive a first message from a power supply source over a bus, the first message is to indicate an adjustable power source nature of the power supply source; dynamically send a request to the power supply source over the bus, the request is to indicate a new voltage or current specification; and receive a second message which is to indicate whether the request is accepted or rejected.

In some embodiments, the machine readable storage media has machine readable instructions that when executed cause the machine to perform an operation which comprises: receive a third message which is to indicate that the requested new voltage or current specification based power supply is being provided. In some embodiments, the first message is a Source_Capabilities message which is a Universal Serial Bus (USB) Power Delivery Specification compliant message. In some embodiments, the second message is an ACCEPT or REJECT message which is a USB Power Delivery Specification compliant message. In some embodiments, the third message is a Power Supply Ready message which is a USB Power Delivery Specification compliant message.

In another example, a method is provided which comprises: sending a first message to a device over a bus, the first message is to indicate an adjustable power source nature of an apparatus; receiving a first request from the device over the bus, the request is to indicate a new voltage or current specification; and determining whether the adjustable power source can meet the request, and to send a decision of the determination to the device.

In some embodiments, the method comprises: sending a second message to the device, the second message is to indicate that the requested new voltage or current specification based power supply is being provided to the device. In some embodiments, the first message is a Source_Capabilities message of a Universal Serial Bus (USB) Power Delivery Specification, and wherein the second message is a Power Supply Ready message of the USB Power Delivery Specification.

In some embodiments, the method comprises: receiving a second request to provide a fixed power supply; and providing a fixed power supply to the device in response to the second request. In some embodiments, the method comprises: receiving a third request to provide a power supply to charge a battery; and providing a power supply to the battery in response to the third request. In some embodiments, the method comprises: receiving a fourth request to provide a variable power supply; and providing a variable power supply to the device in response to the fourth request.

In another example, a method is provided which comprises: receiving a first message from a power supply source over a bus, the first message is to indicate an adjustable power source nature of the power supply source; dynamically sending a request to the power supply source over the bus, the request is to indicate a new voltage or current specification; and receiving a second message which is to indicate whether the request is accepted or rejected.

In some embodiments, the method comprises: receiving a third message which is to indicate that the requested new voltage or current specification based power supply is being provided. In some embodiments, the first message is a Source_Capabilities message which is a Universal Serial Bus (USB) Power Delivery Specification compliant message. In some embodiments, the second message is an ACCEPT or REJECT message which is a USB Power Delivery Specification compliant message. In some embodiments, the third message is a Power Supply Ready message which is a USB Power Delivery Specification compliant message.

In another example, an apparatus is provided which comprises: means for sending a first message to a device over a bus, the first message is to indicate an adjustable power source nature of an apparatus; means for receiving a first request from the device over the bus, the request is to indicate a new voltage or current specification; and means for determining whether the adjustable power source can meet the request, and to send a decision of the determination to the device.

In some embodiments, the apparatus comprises: means for sending a second message to the device, the second message is to indicate that the requested new voltage or current specification based power supply is being provided to the device. In some embodiments, the first message is a Source_Capabilities message of a Universal Serial Bus (USB) Power Delivery Specification, and wherein the second message is a Power Supply Ready message of the USB Power Delivery Specification. In some embodiments, the apparatus comprises: means for receiving a second request to provide a fixed power supply; and means for providing a fixed power supply to the device in response to the second request.

In some embodiments, the apparatus comprises: means for receiving a third request to provide a power supply to charge a battery; and means for providing a power supply to the battery in response to the third request. In some embodiments, the apparatus comprises: means for receiving a fourth request to provide a variable power supply; and means for providing a variable power supply to the device in response to the fourth request.

In another example, an apparatus is provided which comprises: means for receiving a first message from a power supply source over a bus, the first message is to indicate an adjustable power source nature of the power supply source; means for dynamically sending a request to the power supply source over the bus, the request is to indicate a new voltage or current specification; and means for receiving a second message which is to indicate whether the request is accepted or rejected.

In some embodiments, the apparatus comprises: means for receiving a third message which is to indicate that the requested new voltage or current specification based power supply is being provided. In some embodiments, the first message is a Source_Capabilities message which is a Universal Serial Bus (USB) Power Delivery Specification compliant message. In some embodiments, the second message is an ACCEPT or REJECT message which is a USB Power Delivery Specification compliant message. In some embodiments, the third message is a Power Supply Ready message which is a USB Power Delivery Specification compliant message.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. An apparatus, comprising:
   a power amplifier, the power amplifier is to couple to a Universal Serial Bus (USB) power adaptor via a power wire of a USB cable bundle;
   an impedance matching stage coupled to the power amplifier;
   an auto tune relay coupled to the impedance matching stage;
   a power transmitter unit (PTU) coil coupled to the auto tune relay, the PTU coil and the auto tune relay are to provide a wireless power transmission to a wireless charging-enabled device;
   a management microcontroller, the management microcontroller is to exchange messages with the USB power adaptor via one or more messaging wires of the USB cable bundle; and
   a radio communication module coupled to the management microcontroller, the radio communication module is to exchange messages with the wireless charging-enabled device;
   wherein:

the PTU coil and the auto tune relay are to provide the wireless power transmission at an initial power level, and the wireless power transmission is received by the wireless charging-enabled device at a received power level, different than the initial power level; and the radio communication module is to receive a message from the wireless charging-enabled device requesting power at a new power level different than the initial power level, the new power level is determined by the wireless charging-enabled device based on a comparison of the initial power level and the received power level.

2. The apparatus of claim 1, wherein:
the management microcontroller is to receive a menu of available power supplies from the USB power adaptor;
the menu of available power supplies comprises power data objects of a USB specification; and
the power data objects comprise a fixed supply object to provide a well regulated fixed voltage power supply on the power wire, a battery object to provide power from a battery connected to the power wire, and a variable supply object to provide a poorly regulated supply, compared to a supply from the fixed supply object, with a minimum and maximum voltage.

3. The apparatus of claim 1, wherein the power amplifier, the impedance matching stage, the auto tune relay, the PTU coil, and the management microcontroller are in a wireless charging mat.

4. The apparatus of claim 1, wherein:
the management microcontroller is to receive a menu of available power supplies from the USB power adaptor, and to request a selected power supply of the available power supplies; and
the initial power level corresponds to the selected power supply.

5. The apparatus of claim 4, wherein:
the management microcontroller is to request the new power level from the USB power adaptor;
the new power level is off menu relative to the menu of available power supplies;
to request the new power level, the management microcontroller is to transmit an ADJUST message to the USB power adaptor; and
the ADJUST message is defined by a reserved data message type in a table of data message types of the USB power adaptor.

6. The apparatus of claim 1, wherein:
the radio communication module is to pair with the wireless charging-enabled device when the radio communication module is in proximity with the wireless charging-enabled device; and
in response to the pairing, the PTU coil and the auto tune relay are to begin to provide the wireless power transmission at the initial power level to the wireless charging-enabled device.

7. The apparatus of claim 1, wherein the new power level is determined by the wireless charging-enabled device based on a measurement of an efficiency, and the measurement of the efficiency is based on a relative spatial alignment of the PTU coil and a power receiver unit (PRU) of the wireless charging-enabled device.

8. The apparatus of claim 1, wherein the new power level is determined by the wireless charging-enabled device based on a measurement of an efficiency, and the measurement of the efficiency is based on an optimal charging efficiency of a battery of the wireless charging-enabled device.

9. The apparatus of claim 1, wherein the new power level is determined by the wireless charging-enabled device based on a measurement of an efficiency, and the measurement of the efficiency is based on real-time power consumption needs of the wireless charging-enabled device under different software demand scenarios.

10. The apparatus of claim 1, wherein:
the new power level is determined by the wireless charging-enabled device based on a measurement of an efficiency;
the measurement of the efficiency is based on the initial power level and the received power level, and a comparison of the efficiency to a threshold; and
the new power level is less than the initial power level when the measurement of the efficiency is less than the threshold.

11. The apparatus of claim 10, wherein the new power level is at a voltage which is less than a voltage of the initial power level when the measurement of the efficiency is less than the threshold.

12. A Universal Serial Bus (USB) power adaptor, comprising:
a memory device to store instructions; and
a processor to execute the instructions to:
transmit a message to a USB-compliant device via one or more messaging wires of a USB cable bundle, wherein the message comprises a menu of available power supplies, and the menu comprises power data objects of a USB specification;
receive a message from the USB-compliant device comprising a request for a selected power supply among the available power supplies in the menu;
in response to the request, provide power to the USB-compliant device with the selected power supply via a power wire of the USB cable bundle;
receive a request from the USB-compliant device for power at a new power level which is off menu relative to the menu of available power supplies, the request for the power at the new power level comprises an ADJUST message, and the ADJUST message is defined by a reserved data message type in a table of data message types of the USB power adaptor; and
in response to the request for the power at the new power level, provide the power to the USB-compliant device at the new power level via the power wire of the USB cable bundle.

13. The USB power adaptor of claim 12, wherein the menu of available power supplies comprises a fixed supply object to provide a well regulated fixed voltage power supply on the power wire, a battery object to provide power from a battery connected to the power wire, and a variable supply object to provide a poorly regulated supply, compared to a supply from the fixed supply object, with a minimum and maximum voltage.

14. The USB power adaptor of claim 12, wherein:
the selected power supply is at an initial power level;
the USB-compliant device is to provide a wireless power transmission to a wireless charging-enabled device at the initial power level;
the wireless power transmission is received by the wireless charging-enabled device at a received power level, different than the initial power level; and
the new power level is determined by the wireless charging-enabled device based on a comparison of the initial power level and the received power level.

15. A non-transitory machine-readable storage media having machine-readable instructions that when executed cause a power provider to perform an operation comprising:
- transmitting a first message to a consumer device, wherein the first message is indicative of a menu of power supplies available to the consumer device on a power supply wire, and the menu is provided according to a Universal Serial Bus (USB) specification;
- receiving a request from the consumer device via one or more messaging wires, wherein the request identifies a selected power supply from among the menu of power supplies;
- providing power to the consumer device according to the selected power supply; and
- after providing the power according to the selected power supply, receiving a request from the consumer device via the one or more messaging wires for a power supply at a new power level, different than a power level of the selected power supply, wherein the power supply at the new power level is off menu relative to the menu of power supplies, the request for the power at the new power level comprises an ADJUST message, and the ADJUST message is defined by a reserved data message type in a table of data message types of the USB specification.

16. The non-transitory machine-readable storage media of claim 15, wherein the menu of available power supplies comprises a fixed supply object, a battery object, and a variable supply object.

17. The non-transitory machine-readable storage media of claim 15, wherein the operation further comprises sending a second message to the consumer device, and the second message is indicative of the power supply at the new power level being ready for transmission.

18. The non-transitory machine-readable storage media of claim 15, wherein the operation further comprises providing power to the consumer device according to the power supply at the new power level.

19. A non-transitory machine-readable storage media having machine-readable instructions that when executed cause a consumer device to perform an operation comprising:
- receiving a first message from a Universal Serial Bus (USB) power adaptor, wherein the first message is indicative of a menu of power supplies available to the consumer device, and the menu is provided according to a USB specification;
- transmitting a request to the USB power adaptor for a selected power supply among the menu of power supplies;
- receiving power according to the selected power supply;
- determining that an efficiency of the consumer device with the power according to the selected power supply is below a threshold; and
- in response to the determining that the efficiency of the consumer device is below the threshold, transmitting a request to the USB power adaptor for a power supply at a new power level, different than a power level of the selected power supply, wherein the power supply at the new power level is off menu relative to the menu of power supplies, and the request for the power at the new power level is defined by a reserved data message type in a table of data message types of the USB specification.

20. The non-transitory machine-readable storage media of claim 19, wherein the menu of available power supplies comprises a fixed supply object, a battery object, and a variable supply object.

21. The non-transitory machine-readable storage media of claim 19, wherein the operation further comprises receiving a second message from the USB power adaptor, and the second message is indicative of the power supply at the new power level being ready for transmission.

* * * * *